US009563647B1

(12) United States Patent
Chopra et al.

(10) Patent No.: US 9,563,647 B1

(45) Date of Patent: Feb. 7, 2017

(54) METHOD AND SYSTEM FOR GENERATING A STATE PROFILE REPORT

(71) Applicant: EMC Corporation, Hopkinton, MA (US)

(72) Inventors: Shelesh Chopra, Bangalore (IN); Vladimir Mandic, San Jose, CA (US); Sudha Narayanan, Bangalore (IN); Preeti Varma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 346 days.

(21) Appl. No.: 13/793,087

(22) Filed: Mar. 11, 2013

(51) Int. Cl.
*G06F 17/30* (2006.01)

(52) U.S. Cl.
CPC ............................... *G06F 17/30283* (2013.01)

(58) Field of Classification Search
None
See application file for complete search history.

(56) References Cited

U.S. PATENT DOCUMENTS 6,282,175 B1 * 8/2001 Steele et al. .................. 370/254
6,990,660 B2 * 1/2006 Moshir et al. ................ 717/171
7,739,689 B1 * 6/2010 Spertus ................. G06F 9/4425 717/130
2010/0088197 A1 * 4/2010 Dehaan ................ G06Q 10/087 705/28
2011/0231361 A1 * 9/2011 Patchava et al. ............. 707/602
2013/0041999 A1 * 2/2013 Cowham ............... G06F 11/302 709/224
2014/0032449 A1 * 1/2014 Kacin et al. .................... 706/12

* cited by examiner

*Primary Examiner* — Ann Tai Tran

(74) *Attorney, Agent, or Firm* — Dergosits & Noah LLP; Todd A. Noah

(57) ABSTRACT

Disclosed are systems and methods relating to profiling software and configuration information associated with one or more entities. In various implementations, software and configuration information associated with one or more entities may be retrieved. The retrieved software and configuration information may provide state information associated with the one or more entities. The retrieved information may be processed to identify one or more changes in the software and configuration information that is associated with the one or more entities. A report may be generated based on the retrieved information. The report may display identified changes in a state for at least one entity based on the changes in the software and configuration information that were identified during the processing.

20 Claims, 10 Drawing Sheets

600

Tracking Method

Initiate one or more tracking agents in an environment (602)

Track information in response to detecting one or more triggering events (604)

Process the tracked information (606)

Update the tracked information based on the processing (608)

Store the updated tracked information in a database system (610)

Done

800

802

804

806

```
11/21/12 17:04:33 MONITOR_RAP: administrator@sles11x64sus1 CHANGED 'NSR client' resource,
                    save set: All;
                    save set: \
"C:\\builds\\763b840\\nw76sp3_win_x64\\win_x64\\networkr";
                save set MBT: All;
                save set MBT: \
"C:\\builds\\763b840\\nw76sp3_win_x64\\win_x64\\networkr";
-----------------
11/21/12 17:04:45 MONITOR_RAP: administrator@sles11x64sus1 CHANGED 'NSR client' resource, sles11x64sus1:
                       group: Default;
                       group: ;
-----------------
11/21/12 17:04:52 MONITOR_RAP: administrator@sles11x64sus1 CHANGED 'NSR client' resource,
  Backup renamed directories: Enabled;
  Backup renamed directories: Disabled;
-----------------
11/21/12 17:05:01 MONITOR_RAP: administrator@sles11x64sus1 CHANGED 'NSR client' resource,
                       group: Default;
                       group: ;
-----------------
11/21/12 17:05:06 MONITOR_RAP: administrator@sles11x64sus1 CHANGED 'NSR group' resource, Default:
                    autostart: Disabled;
                    autostart: Start now;
-----------------
```

Figure 8

STATE PROFILER REPORT

902

Report Type – Client report
Report generated as on 11/11/2012 @ 11:30 PM

Previous report was generated on 11/10/2012 @ 10.45 PM

904

Jupiter.abc.com Host Details

| Component | Details | Changes since last profile |
|---|---|---|
| Host Name | Jupiter.abc.com | None |
| Host IP Address | 192.23.23.10 | None |
| Operating System | Windows 7 Version 6.1.7600 | None |
| Processor | Intel(R) Core(TM) i5-2520M CPU @ 2.50GHz, 2501 Mhz, 2 Core(s), 4 Logical Processor(s) | None |
| Physical Memory | 3.24 GB | None |
| Disk Usage | Local Volume C:\ (Simple) – Total : 160 GB Free : 132 GB<br>New Volume D:\ (Simple) – Total : 40 GB Free : 31 GB | Yes (View Changes) |
| Domain/Username/Password | Domain – abc.com<br>Username – Administrator<br>Username – Test1<br>Username – Test2<br>Username – Test3 | Yes (View Changes) |
| Time Zone | IST | None |
| Firewall | Status - On | Yes (View Changes) |

906

Jupiter.abc.com Software list

| Software Name | Details | Changes since last profile |
|---|---|---|
| SoftwareA | Version – 8.1 Build 1231<br>Publisher – A Company<br>Location – C:\Program Files\ASoftware<br>Component - Server | Yes (View Changes) |
| SoftwareB | Version – 10.1.4 Build 1212<br>Publisher – B Company<br>Location – C:\Program Files\BSoftware | Yes (View Changes) |
| Software C | Version – 8.1 Build 234<br>Publisher – C Company<br>Location – C:\Program Files\CSoftware | None |
| SoftwareD | Version – 8.1 Build 123<br>Publisher – D Company<br>Location – D:\DSoftware | Yes (View Changes) |

STATE PROFILER REPORT

Report Type – Software Configuration report

Jupiter.abc.com - SoftwareA Configuraiton changes between 10/11/2012 & 11/11/2012

1004

| Software component | Previous State | Current State |
|---|---|---|
| Version | SoftwareA 7.6 | SoftwareA 7.7 |
| Service Pack | SP 5 | SP1 |
| Build Number | 2341 | 35 |
| Type | Software A Client | Software A StorageNode |

1006

Configuration

| Parameter | Previous value | Current Value |
|---|---|---|
| Schedule Backup | Enabled | Enabled |
| Client Direct | Enabled | Enabled |
| Block Backup | Disabled | Enabled |
| Saveset | All | All |
| Group | Default | Default, Full |
| Pool | Full | Full |
| Schedule | Full Every Friday | Full Every Monday |
| Backup command | Default | Default |
| Client Parallelism | 4 | 4 |
| Storage Node | Mars.abc.com | Mars.abc.com |
| Recover Storage Node | Neptune.abc.com | Neptune.abc.com |
| Virtual Client | Disabled | Disabled |
| Browse policy | Month | Week |
| Retention Policy | Month | Month |
| Checkpoint restart | Disabled | Disabled |
| | | |
| | | |
| | | |

Figure 10

METHOD AND SYSTEM FOR GENERATING A STATE PROFILE REPORT

BACKGROUND

The present invention relates to the field of information technology and more particularly, systems and techniques that relate to deploying a software application.

Enterprise application software may be software used by an organization, such as a business, to perform one or more functions or operations associated with the organization. For example, a business may use enterprise application software, such as Documentum® provided by EMC[2]®, to organize or manage content associated with the business's operations. Services provided by enterprise application software may be on-demand or online tools such as online payment processing, an interactive product catalogue, automated billing systems, security, enterprise content management, internet technology (IT) service management, customer relationship management, enterprise resource planning, business intelligence, project management, collaboration, human resource management, manufacturing, enterprise application integration, and enterprise forms automation.

Enterprise application software may be hosted by host applications which may be implemented on one or more servers, client machines, or other network resources. Thus, an enterprise application may be deployed to multiple host applications which may each be used to execute an instance of the enterprise application and provide services associated with the enterprise application. The host applications may each be implemented or associated with a node in a communications network, such as the Internet. Thus, a host application may be associated with and represented as a network node in a communications network. A node may be a physical network node, such as a host computer or client machine, which may be identified by an Internet protocol (IP) address.

Changes may occur in the environment in which the software application is deployed. Thus, software or hardware associated with a software application or host application may change due to a patch or an upgrade. One or more changes to the environment in which a software application has been deployed may cause errors in the execution or functionality of the software application.

Conventional methods and systems for deploying software over a network remain limited because they do not provide a way to identify or trouble shoot a change which may have caused an error in the execution of a software application.

BRIEF DESCRIPTION OF THE FIGURES

FIG. 8 illustrates an example of changes tracked by a tracking agent, in accordance with some implementations.

FIG. 9 illustrates an example of a client-based report, generated in accordance with some implementations.

FIG. 10 illustrates an example of a software-based report, generated in accordance with some implementations.

DETAILED DESCRIPTION

Figure 1:
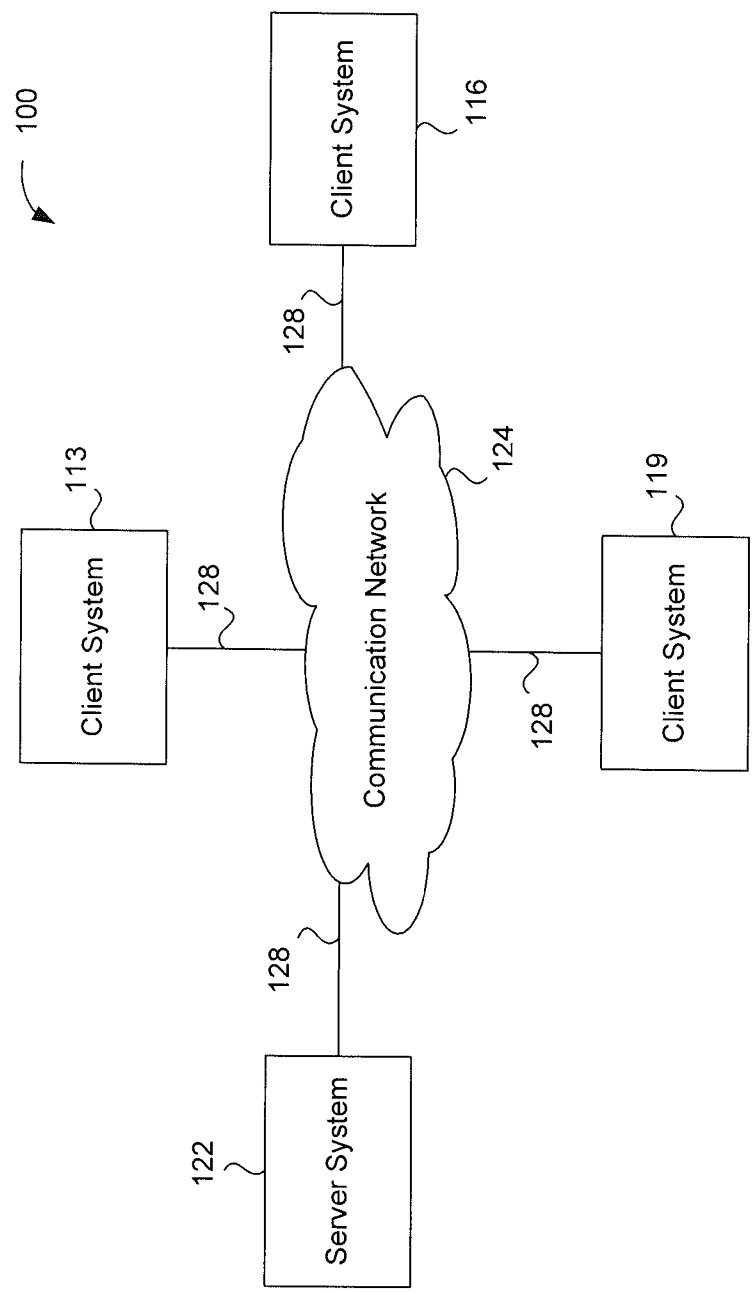
FIG. 1 shows a block diagram of a client-server system and network in which an embodiment of the invention may be implemented.

Environments in which a software application has been deployed may be complex and dynamic. They may undergo changes as frequently as on a daily basis. For example, some changes may include the installing, upgrading, or uninstalling of software applications or software patches, changes in configurations associated with those software applications, and changes at the hardware, firmware, and/or operating system (OS) level. If a deployed software application fails or experiences a problem with its functionality due to a change in its computing environment, conventional methods and systems do not provide any way to track potential sources of the problem. Thus, a system administrator is not provided with any information which may help the administrator troubleshoot the root cause of the problem. Thus, the administrator is often not able to identify or solve the problem because the administrator does not have access to any information that identifies the cause of the problem.

Accordingly, conventional methods and systems do not provide users with a mechanism to determine which change in an environment has caused a problem in a computing environment. Thus, if a problem develops with the functionality of a software application that has been deployed over a network, conventional methods do not provide an efficient way by which an administrator may troubleshoot the cause of a failure. The system administrator may have to manually analyze each change in an environment to understand which change in the environment has caused which problems. Such manual analysis can be labor intensive and does not provide a user with a clear mapping of a cause to an effect.

In various implementations, systems and methods are provided for aggregating information from a computing environment that may be used to identify any changes that may have occurred in the computing environment. One or more components of a system may aggregate the information by inventorying an environment on periodic basis that may be scheduled or on-demand, and gathering information at the software, configuration, and hardware levels. The gathered information may describe changes that may have occurred with software, hardware, or a configuration of either the software or hardware. For example, the information may identify, among other things, an upgrade of software, a change in a hardware component, or a change in a configuration parameter of a host application used to host an enterprise application. A report may be generated based on the information. The report may be customized and configured by a user. The report may provide the user with detailed information about any changes that occurred in the computing environment. The various systems and methods disclosed herein may generate a report automatically, dynamically, and on-demand. The generated report may provide the user with a unified view of any changes that may have occurred in the computing environment. Thus, the report may provide the user with a clear display of a current and previous state of the computing environment, as well as identify whether or not any changes have occurred between the previous state and the current state.

Accordingly, various systems and methods are provided that may retrieve and process information to identify a source of a problem with a deployed software application. An inventory process disclosed herein may be a self-contained process that does not require a user to refer to other documentation, run a configuration checker, manually issue commands, or even issue commands that are partially automated. Thus, a user may efficiently and easily monitor environmental changes dynamically and in real-time. Furthermore, the user may be provided with reports that may be customized based on user input. Additionally, notifications specific to particular types of events may be generated and sent to a user. Thus, a user, such as a system administrator, may be provided with troubleshooting functionalities that do not require burdensome manual intervention. In this way, various systems and methods disclosed herein provide a user with a powerful cause-effect model that may quickly and efficiently identify a problem with a software application, and provide a user with a chronology associated with the identified problem.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
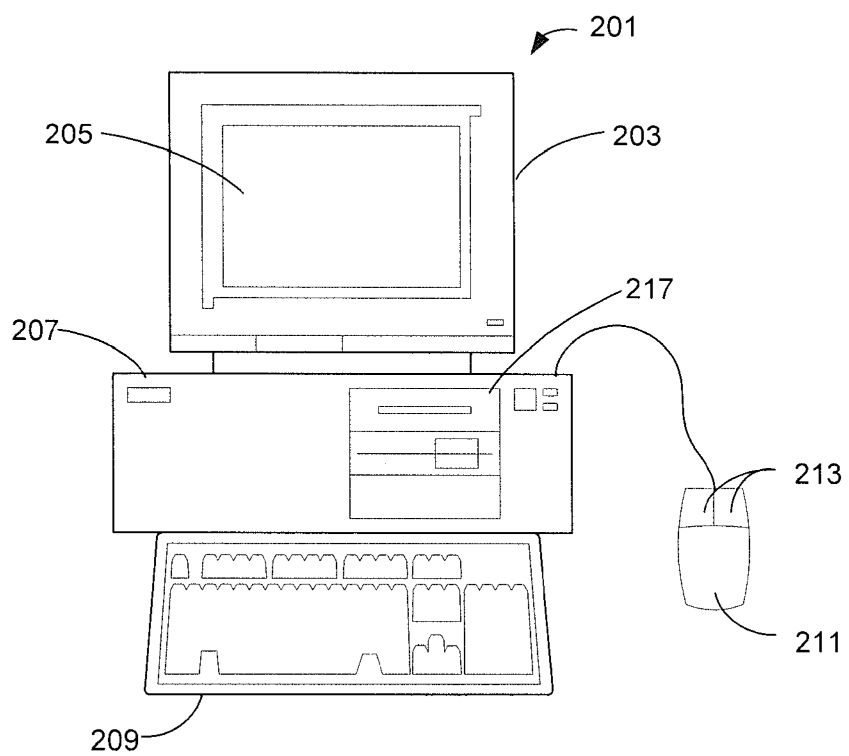
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
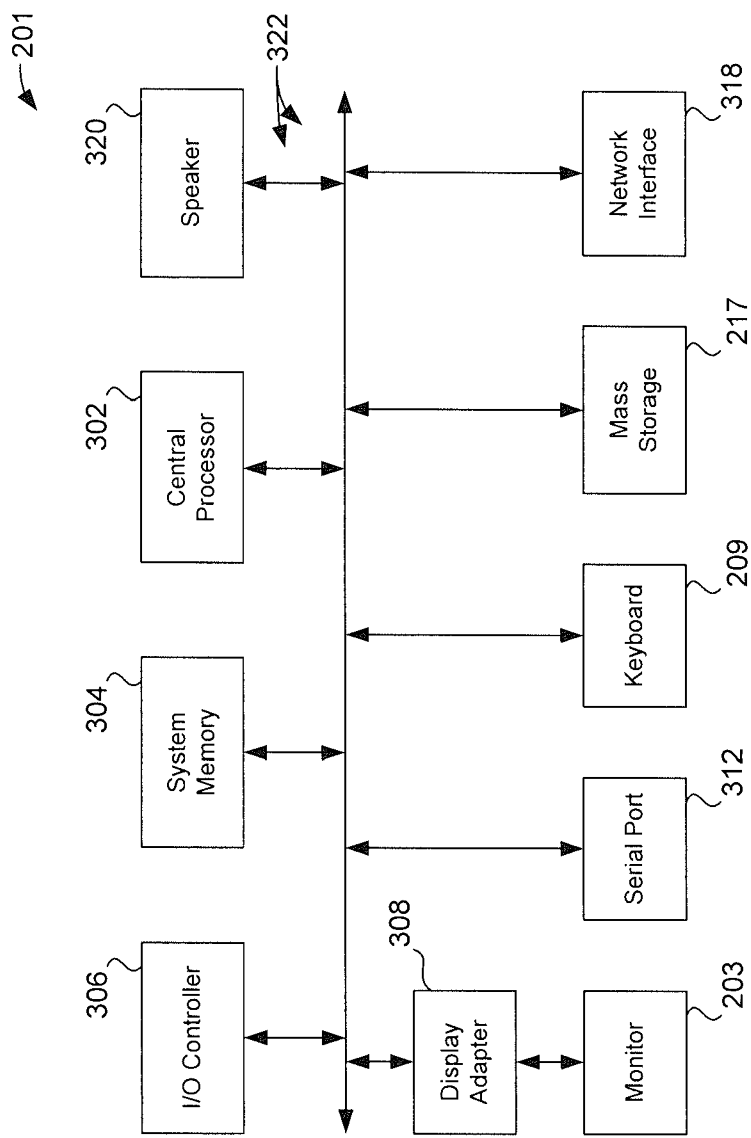
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux. HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 4:
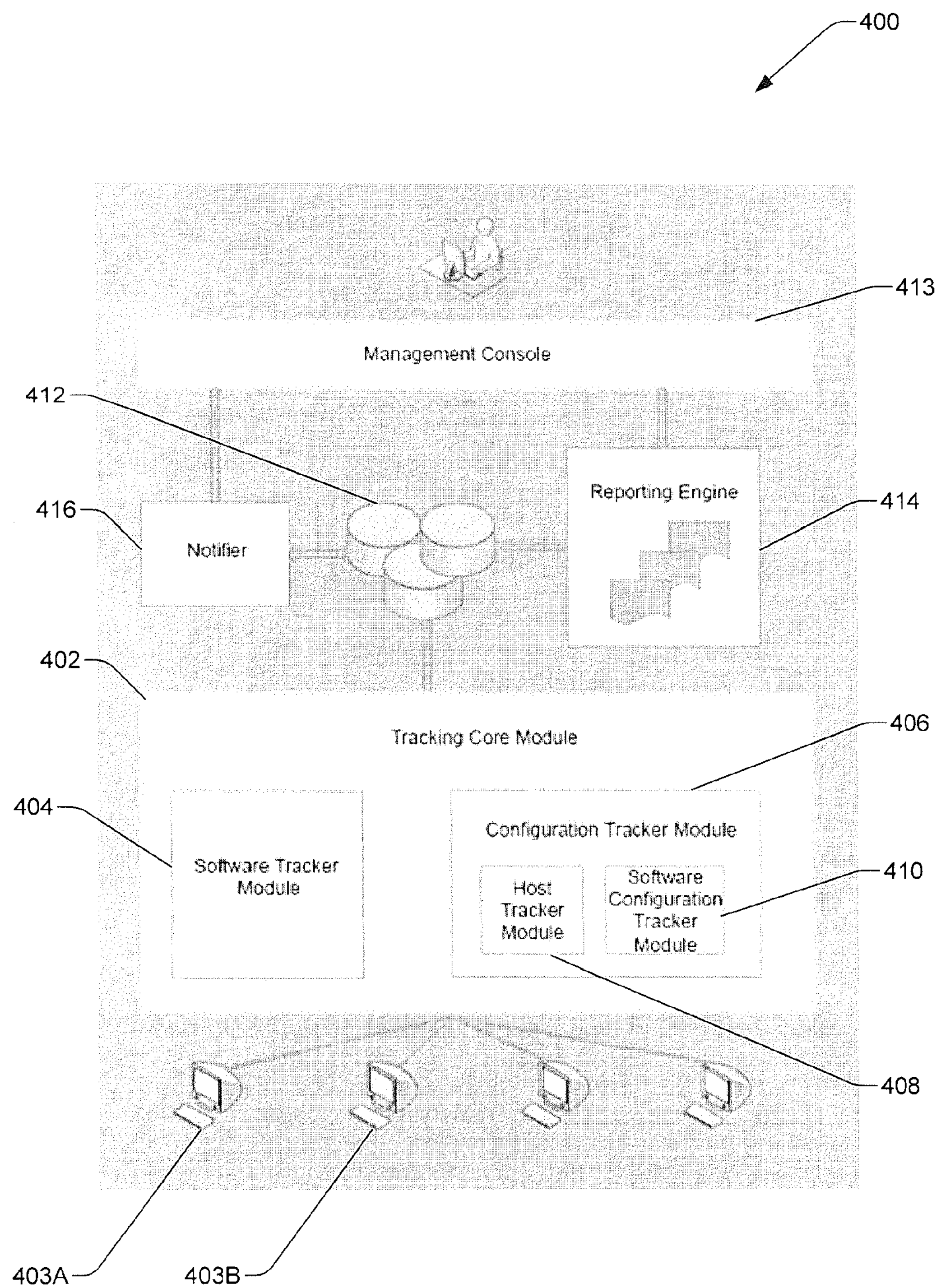
FIG. 4 shows a block diagram of an example of a system for tracking information in a computing environment and generating a report based on the tracked information, implemented in accordance with some implementations.

FIG. 4 shows a block diagram of an example of a system for tracking information in a computing environment and generating a report based on the tracked information, implemented in accordance with some implementations. System 400 may include one or more components that may collect and aggregate tracked information that may identify one or more changes in a computing environment. The tracked information may describe changes that may have occurred with software, hardware, or a configuration of either the software or hardware. System 400 may also include one or more components that generate a report that provides detailed information about any tracked changes that occurred in the computing environment. The report may provide the user with a unified view of a current and previous state of the computing environment, and may identify whether or not any changes have been made.

System 400 may include tracking core module 402 which may track information associated with a computing environment. Tracking core module 402 may monitor and track changes which occur in the computing environment on a periodic basis and according to a predetermined schedule, or dynamically and on-demand. Thus, tracking core module 402 may track information from many different sources about many different types of events in a centralized and self-contained implementation of one or more modules. In some implementations, tracking core module 402 includes several modules which may each be dedicated to one or more tracking functionalities. Thus, a module may be dedicated to tracking and processing a particular type of information from a computing environment.

In some implementations, tracking core module 402 includes one or more tracking agents, or alternatively, may communicate with one or more tracking agents implemented in a computing environment, such as in client machines 403A an 403B. A tracking agent may be a process or module of a program configured to monitor and record information, such as state information, about one or more entities. Thus, a tracking agent may monitor and record information about a software application, a host application used to host the software application, and one or more hardware components associated with the software application and/or the host application. A tracking agent may monitor events in a system and record information in response to detecting one or more triggering events. For example, a tracking agent may monitor a version of software installed at a host server. In response to detecting that a change in the version of software has occurred, the tracking agent may record information about the new version of software, and additionally record metadata associated with the installation of the new software, such as a timestamp and installation path. The triggering events that cause an agent to track information may have been previously defined and configured by a user or a software developer.

The tracking agent may be a standalone process that is implemented on one or more servers and executed remotely in relation to a software application deployed to a host. Thus, a tracking agent may be a cloud-based process that is available on-demand, or triggered by one or more events related to an entity that is being tracked. Accordingly, the standalone agent may be triggered manually, or may be triggered automatically. The standalone agent may handle tracking for multiple entities. Thus, a standalone agent may track changes and information associated with multiple software applications or host applications. Alternatively, a separate instance of a standalone agent may be dedicated to each tracked entity.

The tracking agent may be an embedded process. Thus, the tracking agent may be embedded as a module of code in a software application or host application. The embedded agent may monitor operations performed by and on the software application or host application. For example, an embedded tracking agent may detect when a software application is performing a backup operation, and may track and record any state information generated during the backup operation. The embedded agent may monitor function calls made to and by an application. The embedded agent may also monitor configuration changes made to the software application. The embedded agent may periodically report the monitored changes, or do so dynamically and in response to detecting a change.

In some implementations, tracking core module 402 includes software tracker module 404 which may be a module configured to track the installation or upgrade of software within the computing environment. Thus, software tracker module 404 may track software related data and metadata about software that is currently installed, or has been previously installed on one or more host applications. For example, software tracker module 404 may track information such as a version of software that was installed, a build number, patch information related to a patch that was installed, and individual components of the software that was installed. Software tracker module 404 may track information by querying one or more software applications. Alternatively, software tracker module 404 may query one or more tracking agents that monitor system changes and software changes. Thus, tracker module 404 may be configured to communicate with one or more tracking agents executing on client machines, such as client machines 403A and 403B.

Tracking core module 402 may further include configuration tracker module 406 which may track configuration changes that may occur in a host application or a software application. Thus, configuration tracker module 406 may be configured to track changes that occur in one or more configuration parameters associated with host applications and software applications. In some implementations, configuration tracker module 406 may include host tracker module 408 which may be a module configured to track configuration changes that occur at the host level. For example, host tracker module 406 may track information identifying changes such as changes in firewall on/off states, user related changes, and domain related changes. Configuration tracker module 406 may further include software configuration tracker module 410 which may be a module configured to track configuration changes that occur at the software level. For example, software configuration tracker module 410 may track information identifying changes in a configuration of software hosted by a host application.

System 400 may also include tracking database 412 which may provide a central repository for all information captured by tracking core module 402. Thus, tracking database 412 may include one or more storage volumes that store data collected from multiple different sources in an organized format. Tracking database 412 may include one or more mapping engines which may be used to map data retrieved from multiple heterogeneous sources into a single uniform format.

Furthermore, tracking database 412 may include one or more data stores that store one or more data retention policies which may be applied to the data stored in tracking database 412. Accordingly, tracking database 412 may maintain data in accordance with one or more data retention policies. Thus, data objects and data entries may be automatically deleted after a predetermined period of time. The predetermined period of time may be set according to a default value upon initial configuration of system 400. Alternatively, the predetermined period of time may be configured by a user of management console 413. For example, a system administrator using management console 413 may access one or more settings associated tracking database 412 and provide an input to the management console 413 that determines a period of time after which data should automatically be deleted.

System 400 may include reporting engine 414 which may handle querying of information stored in tracking database 412 and generation of reports based on the queried information. Thus, reporting engine 414 may be configured to query one or more database tables included in tracking database 412 to identify and retrieve any information relevant to the query. Reporting engine 414 may generate a report that displays the queried information in an ordered format, such as one or more data tables. Reporting engine 414 may include a rendering engine configured to render the report as a user interface screen that may be presented to a user via management console 413.

In some implementations, reporting engine 414 is configured to organize data retrieved from the tracking database based on a client. Thus, all tracked information that has been identified by a query and retrieved from tracking database 412 may be organized according to one or more clients associated with the tracked information. The information may be additionally organized based on whether or not the information relates to a host application or a software application. The report may also include state information associated with the client. Thus, the client's current state may be provided in the report and any previously recorded states may also be provided. Client-based reports are discussed in greater detail below with reference to FIG. 9.

In various implementations, reporting engine 414 is configured to organize data retrieved from the tracking database based on a software application associated with the tracked information. For example, a software application may be used as the basis of a query of information stored in tracking database 412. Tracked information associated with the software application may be returned as a result of the query and included in a report that may be rendered and presented to a user. The report may be organized to present information most relevant to the query parameters most prominently in the report. For example, the report might display only the most recent state information associated with the software application. Thus, a query may be directed to a particular point and time associated with a state of a software application. Software-based reports are discussed in greater detail below with reference to FIG. 10.

System 400 may further include notifier 416 which may monitor information stored and retrieved from tracking database 412, and generate a notification in response to detecting a change in the information stored in tracking database 412. Thus, notifier 416 may be a centralized module implemented on one or more servers and configured to monitor a state of data stored in tracking database 412. In response to detecting a change in the state of one or more data tables stored in tracking database 412, notifier 416 may generate a notification that may include information associated with the detected change. The information may include a software application, client, and timestamp associated with the change. Moreover, the notification may include information that identifies a type of change that has occurred. The notification may be a message presented to a user as a user interface component via management console 413. Alternatively, the message may be another form of electronic communication, such as an email message.

Figure 5:
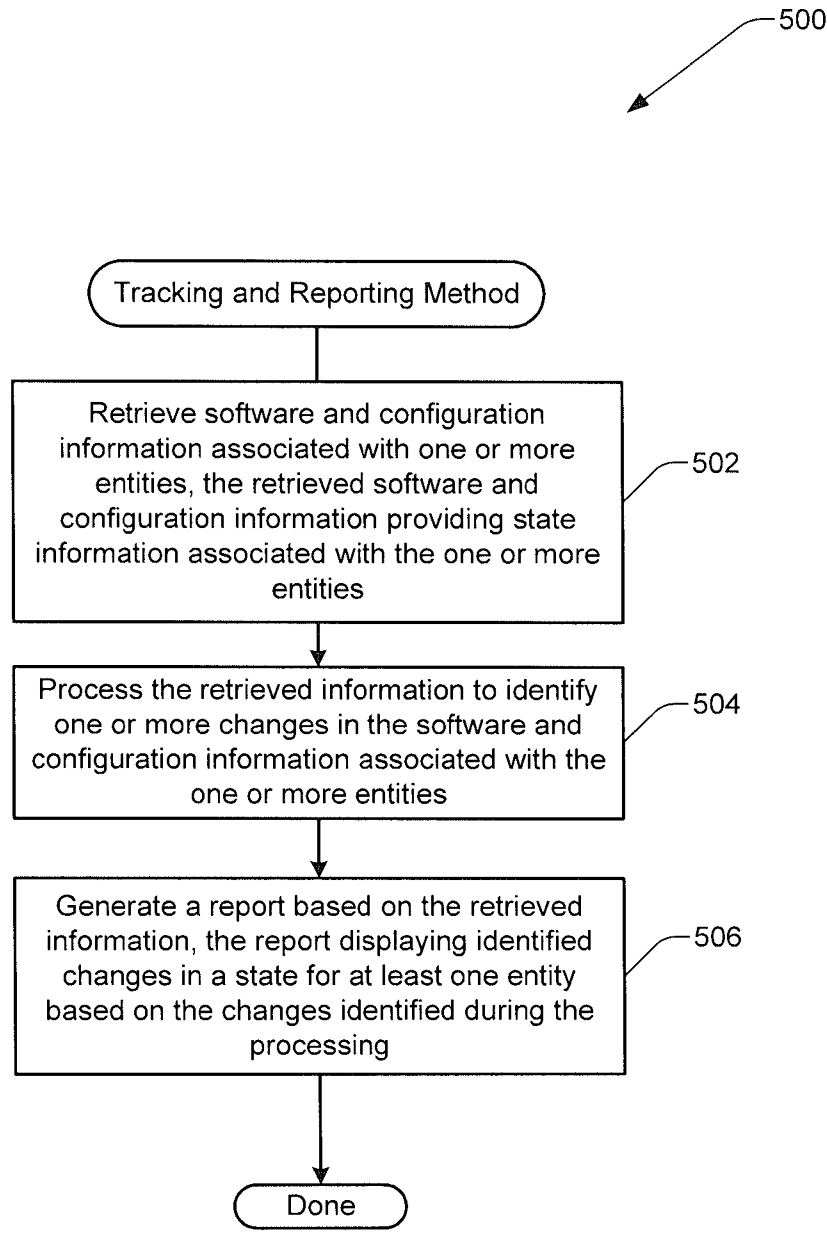
FIG. 5 shows a flowchart of an example of a method for tracking information in a computing environment and generating a report based on the tracked information, implemented in accordance with some implementations.

FIG. 5 shows a flowchart of an example of a method for tracking information in a computing environment and generating a report based on the tracked information, implemented in accordance with some implementations. Tracking state information for entities in a computing environment may provide a detailed history of each entity's state over a period of time. Therefore, if a problem, such as a failure of a software program, develops in the computing environment, a report detailing the history of the computing environment may be used to identify and trouble shoot the problem.

Accordingly, at step 502, software and configuration information associated with one or more entities may be retrieved. In some implementations, the retrieved software and configuration information provides state information associated with the one or more entities. Thus, information about several entities, such as host applications and software applications, may be retrieved from a computing environment. The information may provide detailed state information at the software, configuration, and hardware level for each entity.

At step 504, the retrieved information may be processed to identify one or more changes in the software and configuration information associated with the one or more entities. Accordingly, information about the entities' current state may be compared with previous state information stored in a database system. If any of the software or configuration information has changed, the changes may be identified and marked for subsequent analysis.

At step 506, a report may be generated based on the retrieved information. The report may display identified changes in a state for at least one entity based on the changes identified during the processing. Thus, any changes in a state of an entity may be clearly displayed in the report. Moreover, information about the change may be provided in the report. For example, the current state of a configuration parameter may be displayed along with a previous state of the configuration parameter. In this way, a user may be provided with a comprehensive view of any changes that have occurred for several entities in a computing environment.

Figure 6:
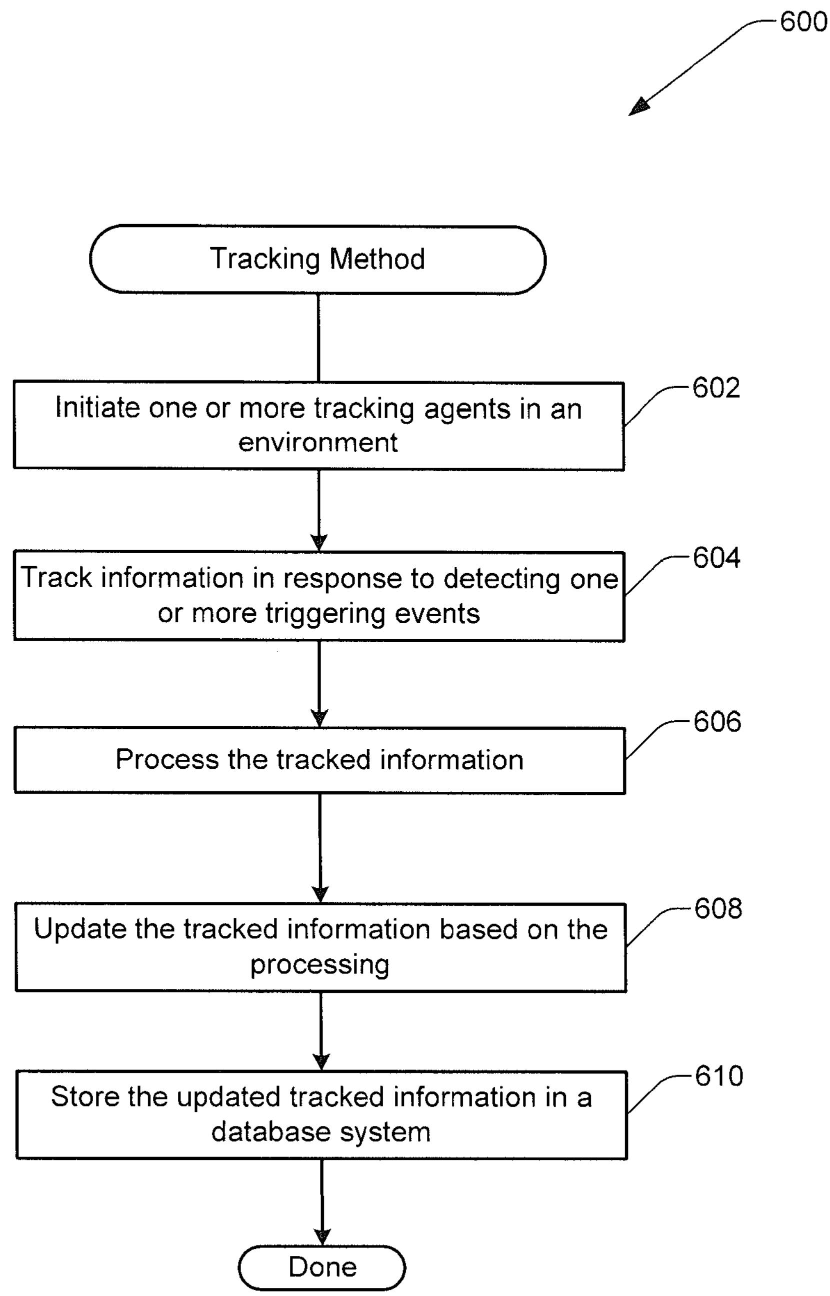
FIG. 6 shows a flowchart of an example of a method for retrieving tracked information from a computing environment, performed in accordance with some implementations.

FIG. 6 shows a flowchart of an example of a method for retrieving tracked information from a computing environment, performed in accordance with some implementations. Method 600 may collect and aggregate tracked information that may identify one or more changes in a client computer or system, a host application executed on the client computer or system, and/or one or more software applications that may be hosted by the host application. The tracked information may describe changes in software, hardware, and a configuration of either the software or hardware. Thus, any changes that may occur within a computing environment may be monitored and tracked. The tracked information may be retrieved and stored in a central repository, such as a tracking database system.

Accordingly, at step 602, one or more tracking agents may be initiated in an environment. As set forth above with reference to FIG. 4, an environment, such as a computing environment, may be a system in which a deployed software application executes. Thus, the environment may include multiple host applications that are used to host one or more software applications. The environment may further include any supporting hardware that is used to execute the host applications and the software applications. The environment may also be specific to an end user or a client machine, such as a customer or client computer. For example, a user may be using an on-demand service, such as Documentum® provided by EMC$^2$®. A computing environment may include hardware and software used to provide the user with on-demand services associated with Documentum®. As set forth above with respect to FIG. 4, multiple agents which may be standalone or embedded agents, may track information from different components or entities in an environment. The monitoring of information by the different tracking agents may be managed centrally by a system component, such as a tracking core module. Thus, the tracking core module may provide a centralized interface through which multiple agents are instructed to begin tracking, and through which multiple agents may be managed.

In some implementations, a tracking agent may be initiated in response to a request received from a user. For example, a user, such as a system administrator, may request an inventory of the most recent system and configuration information. The request may be part of a request for a report identifying any recent changes that may have occurred in a system or environment. The user may issue the request via a user interface provided by a system component, such as a management console. A tracking agent may also be initiated in response to a system generated event. For example, in response to the initialization of a software application hosted by a host application, a tracking agent may also be initialized and begin monitoring information associated with the host application.

At step 604, information may be tracked in response to detecting one or more trigger events. Thus, one or more events may trigger one or more tracking agents to record information associated with the entities that they are tracking. In some implementations, a trigger event is a request made by a user for a report. Thus, as set forth above, a user may request that a report for a particular system component, such as a client machine, be generated. One or more tracking agents associated with the client machine, such as a tracking agent embedded in the host application executed on the client machine, may collect state data associated with the client machine in response to receiving the request. In various implementations, a trigger event is a change in the environment in which a software application executes. Thus, information may be recorded automatically and in response to a change detected by one or more tracking agents. Accordingly, information related to changes in a software application or a configuration of hardware and software associated with the software application may be tracked and forwarded to a system component, such as a tracking core module.

Information may be tracked at the software level. In some implementations, information at the software level is tracked and retrieved in response to detecting a change in a software application, such as an upgrade operation, install operation, or uninstall operation. Accordingly, if software is installed or deployed, one or more agents may track and retrieve information related to the installation or deployment. The information may include data about the software application. For example, retrieved information may identify a software application name, a software version, a platform the software application is intended for, a build number, patch information associated with the software application, and individual components of the software application. Furthermore, the tracking agent may track data relating to one or more resources that the software application depends on. For example, if the software application depends on one or more function libraries or computing resources, information identifying those libraries or resources may be tracked and retrieved. One or more system components, such as a tracking core module, may use the dependency information to identify additional entities that should be tracked, and deploy tracking agents to the additional entities.

Information may also be tracked at the host level. Thus, information about a host application may be tracked in response to detecting a change in the host application software or network connectivity settings. For example, information may be tracked based on a change in a firewall status. Accordingly, information may be tracked and retrieved that identifies a firewall status, such as on or off, and a log of activity related to requests blocked or permitted by the firewall. Furthermore, user related changes, such as account settings, may trigger the tracking and retrieval of information. For example, if one or more new users access software that is hosted by the host application, one or more identifiers associated with the new users may be recorded as well as metadata associated with their interactions with the software. Domain related changes may also trigger the tracking and retrieval of information. For example, if a host application is assigned to a different domain or IP address, information, such as a previous and current domain, may be tracked.

Information regarding hardware related changes may also be tracked. Thus, any changes in hardware components associated with tracked software or host applications may be tracked and recorded. For example, in response to detecting changes in a computer system, information about the hardware, such as an operating system, file system, storage capacity, and processing capabilities, may be tracked and recorded. Accordingly, if any hardware component is upgraded or changed, the change may be tracked and recorded. Furthermore, security related events may be tracked. For example, if a security threat, such as a computer virus, is detected and/or handled by an anti-virus program executing on a client machine, a log of the event and any associated configuration changes may be tracked and retrieved.

FIG. 8 illustrates an example of changes tracked by a tracking agent, in accordance with some implementations. Image 800 illustrates an example of a log file generated by a tracking agent which has been embedded as a module or process in an enterprise application, such as NetWorker® provided by EMC$^2$®. In this instance, the enterprise application provides backup and recovery software services that centralize, automate, and accelerate data backup and recovery operations across a computing environment. The enterprise application may further provide data protection options that are capable of safeguarding data stored in the computing environment. The tracking agent may be implemented as a module of code that tracks changes made in a database system managed by the enterprise application. Thus, the tracking agent may monitor and track configuration changes that have been made to a resource database of the enterprise application. In this instance, because the enterprise application is providing backup services to one or more other software applications, information added to the database as part of the backup services may provide state information for the one or more other software applications for which backup services are provided. Thus, by monitoring changes made to the resource database, the tracking agent may track and record information about the enterprise application and any other software applications that the enterprise application provides backup services for. A log file generated by the tracking agent may be sent to one or more system components, such as a tracking core engine, which may parse and analyze the information included in the log file.

Accordingly, data field 802 displays a first change that has been tracked by the tracking agent. In this instance, a system administrator has changed a configuration parameter associated with a client. The system administrator has changed a path or directory associated with saveset commands for that particular client. The tracking agent detected the change in the parameter and has recorded information associated with the change, such as a time and date when the change was made, as well as what change was made. Furthermore, an identifier that identifies the tracking agent has also been included to identify the source of the tracked information.

Similarly, data field 804 displays a second change that has been tracked by the tracking agent. In this instance, a system administrator has changed another configuration parameter associated with the client. The system administrator has changed a setting that configures the backing up of renamed directories from “Enabled” to “Disabled”. The change has been tracked and logged with associated metadata by the tracking agent.

Data field 806 displays a third change that has been tracked by the tracking agent. In this instance, a system administrator has changed a configuration parameter associated with a group of clients. The system administrator has changed a setting to initiate an autostart of a software application from "Disabled" to "Start now". As similarly set forth above, the change has been tracked and logged with associated metadata by the tracking agent. All of the changes may be stored in the same data object, such as a log file, which may be sent to a centralized system component, such as a core tracking engine. Alternatively, each tracked change may be packaged in its own data object and sent individually.

Returning to FIG. 6, at step 606, the tracked information may be processed. Information aggregated from one or more agents may be processed to store the tracked information in an organized format and simplify subsequent analysis of the retrieved data. Thus, data from various different tracking agents may be aggregated and organized into one or more data tables to provide a comprehensive and centralized repository of tracked information from multiple tracking agents. Accordingly, one data table may include tracked information aggregated from multiple tracking agents residing on multiple client machines. The tracked information may be processed to organize the tracked information such that metadata associated with the tracked information may be represented on a first side of the data table, and data values representing the tracked data may be stored on a second side of the data table.

In some implementations, the tracked information is further processed to identify or flag particular events. For example, book marks or flags may be inserted at identified trigger points to facilitate subsequent navigation to a particular point in time at which an event occurred. The book marks or flags may be placed based on a set of criteria which may be predetermined or user defined. Thus, a system component, such as a tracking core engine, may analyze tracked behaviors of host applications and software applications and identify a particular type of change. For example, a user or system administrator may have previously determined a set of critical events which should be flagged to increase visibility and traceability during subsequent analysis and generation of reports. An example of a critical event may be a backup failure. In response to detecting an identified critical event, such as a backup failure, the event may be tagged or bookmarked with metadata, such as timestamp data, and any other indicators which may facilitate retrieval from a tracking database during a subsequent generation of a report. During a subsequent generation of a report, the book marks may be used to navigate to the critical events.

At step 608, the tracked information may be updated based on the processing. Thus, any additional information or data generated based on the processing of the retrieved tracked data may be associated with the retrieved tracked information. For example, the retrieved tracked information may be modified to include the additional data that was generated based on the processing. Accordingly, if book marks or flags were created, they may be inserted into the tracked data that was retrieved. Alternatively, the generated markers may be stored in a separate data table to facilitate queries run based on marker related data.

At step 610, the updated tracked information may be stored in a database system. Accordingly, the tracked information and any markers associated with the tracked information may be stored in a database system. In some implementations, the database system implements one or more retention policies. Thus, data stored in the database system may be retained and/or deleted in accordance with a set of predetermined retention policies. The predetermined retention policies may be used to analyze metadata associated with information stored the database system and selectively delete or retain information based on a comparison of the metadata to one or more data values specified by a retention policy. For example, a data retention policy may indicate that data older than 6 months should be deleted. If tracked information stored in the database system has associated metadata that indicates that the tracked information is 5 months old, the tracked information may be retained. In this way, tracked information that is stored in the database system may be managed such that a recent history of changes is maintained, while older data is automatically deleted. An example of data that may be stored in a database system is illustrated in Table 1 shown below.

TABLE 1

| Time | Profile Information |
|---|---|
| 10/11/2012 - - - 10:45 PM | Host Profiler - Jupiter.abc.com<br>Mars.abc.com<br>Lunar.abc.com |
| 11/11/2012 - - - 12.50 AM | Host Profiler - Neptune.abc.com<br>Moon.abc.com |
| 10/12/2012 - - - 10:45 PM | Host Profiler - Jupiter.abc.com<br>Mars.abc.com<br>Lunar.abc.com |
| 11/12/2012 - - - 12:50 AM | Software profile - SoftwareA,<br>SoftwareB |
| 11/12/2012 - - - 12:30 AM | Software profile - SoftwareA,<br>SoftwareB |

Table 1 illustrates an example of a database table that may be included in a database system, such as a tracking database. The table may include a first column which includes one or more types of metadata associated with information that has been tracked. As shown in Table 1, the first column may include timestamp data which indicates when the tracked data was recorded. The tracked data may be stored in a second column. As shown in Table 1, various tracked information labeled as "Profile Information" may include host application names and software application names that have been tracked by one or more tracking agents. In this example, the profile information includes state information, such as hostnames or software application names, that were recorded at the time identified in the first column.

Figure 7:
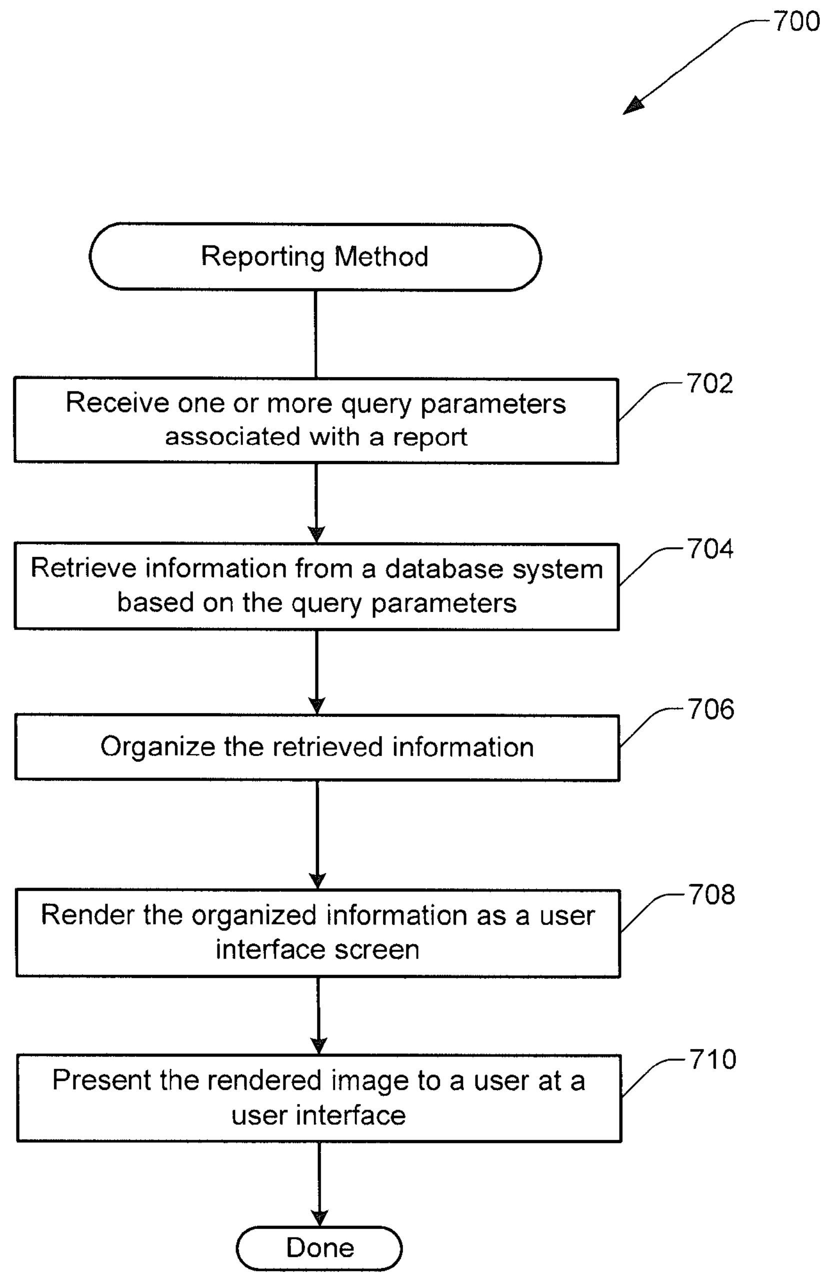
FIG. 7 shows a flowchart of an example of a method for generating a report based on tracked information, performed in accordance with some implementations.

FIG. 7 shows a flowchart of an example of a method for generating a report based on tracked information, performed in accordance with some implementations. Method 700 may generate a report that provides detailed information about a client computer or system, a host application executed on the client computer or system, and one or more software applications that may be hosted by the host application. In addition to providing a detailed unified view of configuration and software information, the report may provide a historical or contextual view of the information. Thus, the report may provide the current values of configuration and software information, as well as the previous values. The report may further identify whether or not any changes have been made, thus providing a user with a clear indication of which changes have occurred in the client machine's environment recently.

Accordingly, at step 702, one or more query parameters may be received. The query parameters may be one or more parameters that may be used to identify tracked information to be included in a report. Thus, the query parameters may be one or more data values that identify one or more criteria associated with the tracked information stored in a database system. The query parameters may be used to identify tracked information that is relevant to a requested report. As set forth above with reference to FIG. 4, a search engine implemented in one or more system components, such as a reporting engine, may be configured to receive one or more query parameters via a management console, and retrieve tracked information based on the received query parameters.

In some implementations, the query parameters are received from a user. Thus, a user may submit a request for a report and specify one or more parameters that may be used as the basis for generating the report. A user may request a report for a particular host or software application. Moreover, a user may specify a time frame for which tracked information should be retrieved. For example, if a host application has stopped working or functioning properly, a user may issue a request for a report for that host application. The user may identify the host application using a host name or identifier, such as an IP address. The user may further identify one or more constraints on to be applied to the query. For example, the user may specify that information from the past 24 hours should be provided.

Alternatively, the query parameters may be default parameters that are applied automatically. For example, one or more automated processes, such as tracking agents, may detect a failure in the execution of a software application. An automated process may automatically request that a report be generated for the software application that failed, and for the host applications used to execute the software application. The request may further specify one or more additional default parameters, such as a default temporal constraint, that may have been previously determined by a user, system administrator, or software developer. Default parameters that trigger and configure the automatically requested report may be configured by a user via a system component, such as a management console.

At step 704, tracked information may be queried and retrieved from a database system based on the query parameters. Thus, the query parameters may be checked against one or more data values stored in the database system to identify one or more data objects or records that match the query parameters. For example, if a query parameter is a host name, any data object or record stored in the database system that includes one or more data values that match the host name may be identified as a result of the query, and retrieved from the database system. In this way, all tracked information relevant to a requested report may be identified and retrieved by a system component, such as a reporting engine.

At step 706, the retrieved information may be organized. Accordingly, once the information has been retrieved, it may be arranged according to an order that may form the basis of a subsequent presentation of the information. For example, tracked information associated with a host application may be arranged according to metadata associated with the tracked information, such as timestamp data. In this way, the tracked information may be arranged chronologically to present a chronological account of state information associated with the host application. The arrangement or organization of the retrieved information may be specified or configured by a user. For example, a user may specify that retrieved information should be sorted chronologically, by a client identifier, by a hostname, by a software application, or any other parameters associated with the entities for which information has been tracked.

In addition to sorting the information according to one or more query parameters, the retrieved information may be arranged into structured representations that clearly identify whether or not any recent changes have been made. Thus, a system component, such as a reporting engine, may be configured to generate a structured representation of the organized information and one or more identifiers that may simplify a presentation of the organized information. For example, information associated with a host application, such as an IP address and hardware information, may be presented on a first side of a data table. On a second side of the data table, one or more identifiers may be presented that identify whether or not any of the information associated with the host application has recently changed. For example, if an IP address has not changed recently, such as since the previous time a tracking agent recorded the host application's IP address, then an identifier may be presented that indicates that no changes have been made recently. In another example, if an operating system of a computer system used to execute the host application has been changed, an identifier may be presented that indicates that a change has occurred.

At step 708, the organized information may be rendered. A system component, such as a reporting engine, may also include a rendering engine which may be configured to render the retrieved and organized information into a format that may be presented to a user at a user interface. Thus, one or more data tables that include the organized information may be rendered as user interface components. Moreover, one or more interactive elements, such as links to data objects, may be rendered. For example, if an identifier is presented that indicates that a change has occurred, an interactive link may be rendered that provides a link to a data object that includes the previously tracked information. In this way, the rendered version of the organized information may display the most recent information available, indicate whether or not a change has occurred recently, and provide an interactive link to additional information, such as information that was stored prior to the change.

At step 710, the rendered image may be presented to a user at a user interface. Thus, the rendered information may be provided to a user via a communications network and presented to the user as a user interface screen. In some implementations, the rendered image is saved in a database system for subsequent access by a user. Thus, a report may be generated, rendered, and stored for future access by a user. Once presented to the user, the user may view an organized representation of the information that was initially requested, and the user may interact with links to one or more other data objects that may provide the user with additional information about the tracked entities identified in the report.

FIG. 9 illustrates an example of a client-based report, generated in accordance with some implementations. A client-based report may display information about a particular client system or machine. The client may be used to execute a host application that may host a software application. Accordingly, the client-based report illustrated in image 900 may present information about a client, where the information is additionally organized by host application and software application.

In some implementations, image 900 includes data field 902 which displays general information about the report that has been generated. Accordingly, the information displayed in data field 902 may provide a user with information about the contents of the report, and further provide the user with contextual information that identifies whether or not previous reports have been generated. For example, data field 902 may display the type of report that has been generated. As shown in FIG. 9, a client-based report has been generated. Moreover, data field 902 may show timestamp data, such as when the report was generated, and historical data, such as when one or more previous reports were generated. In some implementations, data field 902 includes a link to a previous report if one exists.

Image 900 may include data field 904 which may display information about one or more host applications. As shown in FIG. 9, information is shown for a host application associated with the host name "jupiter.abc.com". Thus, in this instance, a user may have requested a report for a client machine used to execute host application "jupiter.abc.com". In response to the request, a report has been generated which provides all tracked information associated with the host application. Accordingly, data field 904 displays various information, such as a host name, host IP address, domain name, and firewall status. Moreover, data field 904 displays hardware information associated with the client machine, such as an operating system, physical memory, and various hardware metrics, such as disk usage. Furthermore, data field 904 may display one or more indicators which indicate whether or not any of the information has changed since a previous point in time, which may be a previous generation of a report or a previous retrieval of tracked information. The value of the identifier may be determined by comparing a current data value for a type of information, such as a host name, with a data value which was recorded previously. If the compared data values are different, data field 904 may indicate that a change has occurred.

Image 900 may further include data field 906 which may display information about software that is hosted by the one or more host applications executing on a client machine. As shown in FIG. 9, the host application associated with the host name "jupiter.abc.com" is used to host several software applications. Thus, data field 906 may display information associated with software applications SoftwareA, SoftwareB, SoftwareC, and SoftwareD, such as a version, publisher, file path, and component list. As set forth above, data field 906 may further indicate whether or not any changes have occurred in any of the types of tracked information.

FIG. 10 illustrates an example of a software-based report, generated in accordance with some implementations. A software-based report may display information about a particular software application and one or more host applications used to host the software application. Accordingly, the software-based report illustrated in image 1000 may organize and present information based on different types of configuration information associated with the software application.

Image 1000 may include data field 1002. As similarly set forth above with respect to FIG. 9, data field 1002 may display general information about a report that has been generated. Thus, the information displayed in data field 1002 may provide with a user with information about the contents of the report, and may further provide the user with contextual information that identifies whether or not previous reports have been generated. Data field 1002 may also provide information about the query parameters that were used to generate the report. For example, as shown in FIG. 10, data field 1002 indicates that the results of the report have been constrained based on time and data parameters. Thus, the report has been constrained to changes between 10/11/2012 and 11/11/2012.

In various implementations, image 1000 includes data field 1004 which may display information about a software component or software application that may have formed the basis of the report. For example, when requesting a report, a user may have identified a particular software application or component for which the report should be generated. Thus, data field 1004 may display several categories of information, such as a version, service pack, build number, and software type associated with the software application or component that was identified by the user. Furthermore, data field 1004 may display state information associated with each category of information. As shown in FIG. 10, data field 1004 displays a current state and a previous state for each category of information. Thus, a user viewing the report may be able to determine that a version of software has changed based on a comparison of the current state and the previous state. Alternatively, as previously discussed with reference to FIG. 9, a system component, such as a reporting engine, may compare the current state and previous state and provide an indicator that indicates whether or not a change has occurred.

Image 1000 may further include data field 1006 which may display configuration information associated with the software application or component that formed the basis of the report. Thus, data field 1006 may display retrieved information for several categories of configuration information. For example, data field 1006 may display current and previous settings for configuration parameters such as whether or not a scheduled backup has been enabled, group and pool settings, various policy information, such as a browse policy and retention policy, and network connectivity information, such as node information. As set forth above, data field 1006 may display current and previous state values, or provide indicators or identifiers which identify whether or not a change has occurred.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for profiling software information and configuration information and a currently available hardware capacity associated with one or more entities, the method comprising:

determining, by the processor, occurrence of a trigger event in a first entity of a plurality of entities, wherein the trigger event triggers recording of information by a first tracking agent associated with a first software application executing on the first entity and a second tracking agent associated with a second software application executing on a second entity, the first software application being interdependent with the second software application;

retrieving, by a processor, the information based on the occurrence of the trigger event, wherein the information comprises software information, configuration information and a currently available hardware capacity associated with the first entity and the second entity;

processing, by the processor, the retrieved information to identify one or more changes in the software information, the configuration information and the currently available hardware capacity associated with the first entity and the second entity; and generating, by the processor, a report based on the retrieved information, the report displaying identified changes in a state for at least the first entity based on the changes in the software information, the configuration information and the currently available hardware capacity identified during the processing.

2. The method of claim 1, wherein the first entity comprise at least one host application or at least one software application.

3. The method of claim 1, wherein the software information, the configuration information and the currently available hardware capacity includes one or more types of information selected from the group consisting of: a host name, a host internet protocol (IP) address, a domain name, a firewall status, a software version, a software publisher, a software build number, software patch information, a file path, a software component name, an operating system, disk usage, a scheduled backup setting, group and pool settings, a browse policy, a data retention policy, and network connectivity information.

4. The method of claim 1, wherein the software information, the configuration information and the currently available hardware capacity associated with the first entity is retrieved by at least one the first tracking agent.

5. The method of claim 4, wherein the first tracking agent is implemented in one or more servers remote from the plurality of entities.

6. The method of claim 4, wherein the first tracking agent is embedded in the software application hosted by at least the first entity entities.

7. The method of claim 6, wherein the software application provides backup and recovery services in a computing environment.

8. The method of claim 1, wherein the report includes identifiers that identify configuration parameters that have changed.

9. The method of claim 1, wherein the report is requested for a client, and wherein the report is organized based on the client.

10. The method of claim 1, wherein the report is requested for a software application, and wherein the report is organized based on the software application.

11. The method of claim 1 further comprising:

generating, by the processor, a notification that provides a user with a notification that at least part of the software information, the configuration information and the currently available hardware capacity associated with the first entity has changed.

12. A non-transitory machine-readable medium carrying one or more sequences of instructions which, when executed by one or more processors, cause the one or more processors to carry out the steps of:

determining, by the processor, occurrence of a trigger event in a first entity of a plurality of entities, wherein the trigger event triggers recording of information by a first tracking agent associated with a first software application executing on the first entity and a second tracking agent associated with a second software application executing on a second entity, the first software application being interdependent with the second software application;

retrieving, by a processor, the information based on the occurrence of the trigger event, wherein the information comprises software information, configuration information and a currently available hardware capacity associated with the first entity and the second entity;

processing, by the processor, the retrieved information to identify one or more changes in the software information, the configuration information and the currently available hardware capacity associated with the first entity and the second entity; and generating a report based on the retrieved information, the report displaying identified changes in a state for at least the first entity based on the changes in the software information, the configuration information and the currently available hardware capacity identified during the processing.

13. The machine-readable medium of claim 12, wherein the first entity and the second entity comprise at least one host application or at least one software application.

14. The machine-readable medium of claim 12, wherein the at least part of the software information, the configuration information and the currently available hardware capacity is retrieved by at least the first tracking agent.

15. The machine-readable medium of claim 14, wherein the first tracking agent is embedded in the software application hosted by at least one of the plurality of entities, and wherein the software application provides backup and recovery services in a computing environment.

16. The machine-readable medium of claim 12, wherein the steps further comprise:

generating a notification that provides a user with a notification that at least part of the software information, the configuration information and the currently available hardware capacity associated with the first entity has changed.

17. A system for profiling software information, configuration information and a currently available hardware capacity associated with one or more entities, the system comprising:

a processor; and one or more stored sequences of instructions which, when executed by the processor, cause the processor to carry out the steps of:

determining, by the processor, occurrence of a trigger event in a first entity of a plurality of entities, wherein the trigger event triggers at least one recording of information by a first tracking agent associated with a first software application executing on the first entity and a second tracking agent associated with a second software application executing on a second entity, the first software application being interdependent with the second software application;

retrieving, by a processor, the information based on the occurrence of the trigger event, wherein the information comprises software information, configuration information and a currently available hardware capacity associated with the first entity and the second entity;

processing, by the processor, the retrieved information to identify one or more changes in the software information, the configuration information and the currently available hardware capacity associated with the first entity and the second entity; and generating a report based on the retrieved information, the report displaying identified changes in a state for at least the first entity based on the changes in the software information and the configuration information and the currently available hardware capacity identified during the processing.

18. The system of claim 17, wherein the first entity and the second entity comprise at least one host application or at least one software application.

19. The system of claim 17, wherein the software information and the configuration information, the currently available hardware capacity is retrieved by at least one tracking agent embedded in the software application hosted by at least one of the plurality of entities, and wherein the software application provides backup and recovery services in a computing environment.

20. The system of claim 17, wherein the steps further comprise:

generating a notification that provides a user with a notification that at least part of the software information, the configuration information and the currently available hardware capacity associated with the first entity has changed.

* * * * *